United States Patent [19]
Shimizu et al.

[11] Patent Number: 5,248,374
[45] Date of Patent: Sep. 28, 1993

[54] STRIP WINDER FOR A TIRE BUILDING MACHINE

[75] Inventors: Kentaro Shimizu; Osamu Fujiki; Mitsuru Hitotsuyanagi, all of Hyogo, Japan

[73] Assignee: Toyo Tire & Rubber Co., Ltd., Osaka, Japan

[21] Appl. No.: 740,696

[22] Filed: Aug. 6, 1991

[30] Foreign Application Priority Data

Aug. 8, 1990 [JP] Japan .................................. 2-211033
Jul. 4, 1991 [JP] Japan .................................. 3-190866

[51] Int. Cl.⁵ .......................................... B29D 30/30
[52] U.S. Cl. .................. 156/406.4; 156/133; 156/405.1; 156/446; 156/510
[58] Field of Search ............... 156/405.1, 406.4, 406.6, 156/431, 446, 517, 510, 522, 123, 130, 133, 134

[56] References Cited

U.S. PATENT DOCUMENTS

| | | | |
|---|---|---|---|
| 4,738,743 | 4/1988 | Satoh et al. | 156/405.1 |
| 4,892,609 | 1/1990 | Nakanome et al. | 156/406.4 |
| 5,102,490 | 4/1992 | Becker et al. | 156/406.4 |

FOREIGN PATENT DOCUMENTS 59-207227 11/1984 Japan.

Primary Examiner—Geoffrey L. Knable
Attorney, Agent, or Firm—Jordan and Hamburg

[57] ABSTRACT

A strip winding system for a tire building machine which comprises a vertically swingable frame disposed below and forwardly of a tire building drum, a slide frame adapted to move back and forth along the longitudinal axis of the swing frame, which slide frame carries a strip transport belt, a longitudinally stationary cutting bed, a traveling cutter and a longitudinally movable cutting bed as disposed in that order, the cutting beds having suction orifices opening on the juxtaposed upper surfaces thereof, and a clamp means for fixing the conveyance run of the transport belt. Both of the cutting beds may be stationary in the longitudinal direction. The system permits winding of the strip under no tension, and since the strip is fixed both forwardly and rearwardly of the cutting line, insures rectilinear cutting.

2 Claims, 6 Drawing Sheets

STRIP WINDER FOR A TIRE BUILDING MACHINE

FIELD OF THE INVENTION

The present invention relates to a strip winder for winding a strip member such as an inner liner, ply cord or the like on a building drum and joining the ends of the strip in an endless manner.

BACKGROUND OF THE INVENTION

As a strip winder for the primary building machine for automotive tires, the apparatus disclosed in Japanese Kokai Patent Application No. 59-207227 is known. This apparatus comprises an anvil for cutting a continuous strip, a transfer conveyer and a brake roller disposed in the order mentioned on one side of the top of a tire building machine, and an overhead vacuum cap adapted to suck up and lift a leading end of the strip which lies on the anvil at the forward end of said conveyer and then to travel forward to bring said leading end of the strip into pressure contact with the tire building drum. In this arrangement, after release of the suction force, the tire building drum is driven nearly one turn to take up said strip thereon, and in this state, the strip on said anvil is cut to length while it is held stationary by said vacuum cap and while the trailing end of the strip which is disposed forwardly of the cutting line is lifted by said vacuum cap, the anvil located rearwardly of said cutting line and the strip on the conveyer are shifted back, together with the conveyer, away from the position under the vacuum cap. Thereafter, said vacuum cap is lowered to join the trailing end of the strip to the leading end of the strip on the tire building drum.

In the above arrangement, however, when the building drum to which the leading end of the strip is secured is driven to wind the strip on the drum, the brake roller at the rear end of the conveyer applies a tension force to the strip to thereby stretch thin and narrow portions of the strip and exaggerate the unevenness of thickness and width. Moreover, while the strip on the anvil is cut, the portion of the strip located behind the cutting line, that is to say on the conveyer side, is kept stationary by clamp means, but since the strip located forwardly of the cutting line, that is to say on the drum side, is loose, the strip is displaced during the cutting operation to cause non-rectilinear cutting so that when the leading and trailing ends of the strip are joined on the drum, either a gap or an overlap is formed at the joint to necessitate subsequent correction, thus making it difficult to implement an automatic production line.

SUMMARY OF THE INVENTION

The present invention provides a strip winder which winds a strip under no tension and insures rectilinear cutting of the strip by fixing the strip both forwardly and rearwardly of the cutting line.

The strip winding system of the invention for a tire building machine comprises a swing frame disposed below and forwardly of a building drum and extending in a direction at right angles to the axis of the building drum in such a manner that it can swing vertically about a pivot close to one end thereof which is farther away from said building drum, a slide frame mounted on said swing frame so as to be slidable along the longitudinal axis thereof and carrying as mounted thereon a strip transport belt, a longitudinally stationary cutting bed and a longitudinally movable cutting bed disposed in the order mentioned from said pivot of said swing frame toward said building drum, a traveling cutter for cutting said strip as disposed between said stationary cutting bed and movable cutting bed, said stationary and movable cutting beds respectively having suction orifices opening on the juxtaposed upper surfaces thereof for fixing said strip in position, said slide frame having a post carrying a clamp on top thereof for fixing the conveyance run of said transport belt.

When the swing frame is in the down position and the slide frame is in the standby position below and forwardly of the tire building drum, a strip is set on the stationary cutting bed and transport belt, with its leading end aligned with the front edge of the stationary cutting bed and a negative pressure is applied to the suction orifices opening on the upper surface of the stationary cutting bed. Then, the slide frame is advanced and the swing frame is swung up to bring the leading end of the strip into pressure contact with the lower end of the drum.

Then, the conveyance run of the transport belt is locked in position with said clamp and the application of the negative pressure to said stationary cutting bed is suspended. In this condition, the slide frame is advanced over a predetermined distance to shift the transport belt forward while the strip is kept stationary, and the leading end of the strip is transferred from the first cutting bed onto the conveyance run of the transport belt. Thereafter, said clamp is opened and the tire building drum and the transport belt are driven in synchronism to wind the strip on the time building drum under no tension. When the wound portion of the strip has reached a predetermined length which is less than one circumferential length of the building drum, preferably close to one circumferential length, the tire building drum and the transport belt are stopped. Then, the clamp is closed again to lock the transport belt in position and the slide frame is then driven back to shift the transport belt, stationary cutting bed and movable cutting bed backward over a predetermined distance while the strip is kept stationary. In this condition, the distance from the traveling cutter interposed between the stationary and movable cutting beds to the winding start point at the lower end of the tire building drum is equal to the difference between one circumferential length of the tire building drum and the wound length of the strip, that is to say the unwound length of the strip.

Then, a negative pressure is applied to the suction orifices opening on the upper surfaces of the stationary and movable cutting beds to secure the strip in position on the stationary and movable cutting beds, after which the traveling cutter is actuated to cut the strip. Thereafter, the movable cutting bed is advanced away from the stationary cutting bed and the tire building drum is driven in a synchronized fashion to wind the remaining length of the strip on the drum under no tension. Upon completion of this residual winding, the application of a negative pressure to the movable cutting bed is terminated and the rotation of the building drum and the advance of the movable cutting bed are respectively stopped. The swing frame is then caused to descend, the slide frame driven back and the movable cutting bed shifted back to the initial standby position.

Thus, in accordance with this invention, inasmuch as the winding of a strip can be effected under no tension, the inherent unevenness of thickness and width of the strip is not amplified by the winding operation. Furthermore, since the strip can be held stationary both forwardly and rearwardly of the cutting line during the cutting operation, rectilinear cutting can be realized and, in addition, the elongation of the strip can be prevented.

It should also be understood that the provision of a cutting bed which is movable in the longitudinal direction permits successful winding even where the cut end of the strip is oblique.

In lieu of said stationary cutting bed and movable cutting bed, a first and a second cutting bed, both of which are stationary in the longitudinal direction, can be employed. In this embodiment, all the operations prior to cutting by a traveling cutter proceed in the same way as in the first embodiment described above. However, whereas the movable cutting bed is advanced away from the stationary cutting bed after the cutting operation in the first embodiment, the slide frame and, hence, both the first and the second cutting beds, which are fixed in the longitudinal direction on the slide frame, are advanced in the second embodiment. And as the tire building drum is driven in synchronism with the advancing motion of the slide frame, the remaining length of the cut strip is wound on the drum under no tension. Upon completion of this winding, the application of a negative pressure to the second cutting bed is suspended and the rotation of the building drum and the advance of the slide frame are respectively stopped. The swing frame is then caused to descend and the slide frame is shifted back to the initial standby position.

DESCRIPTION OF THE PREFERRED EMBODIMENTS OF THE INVENTION

Figure 1:
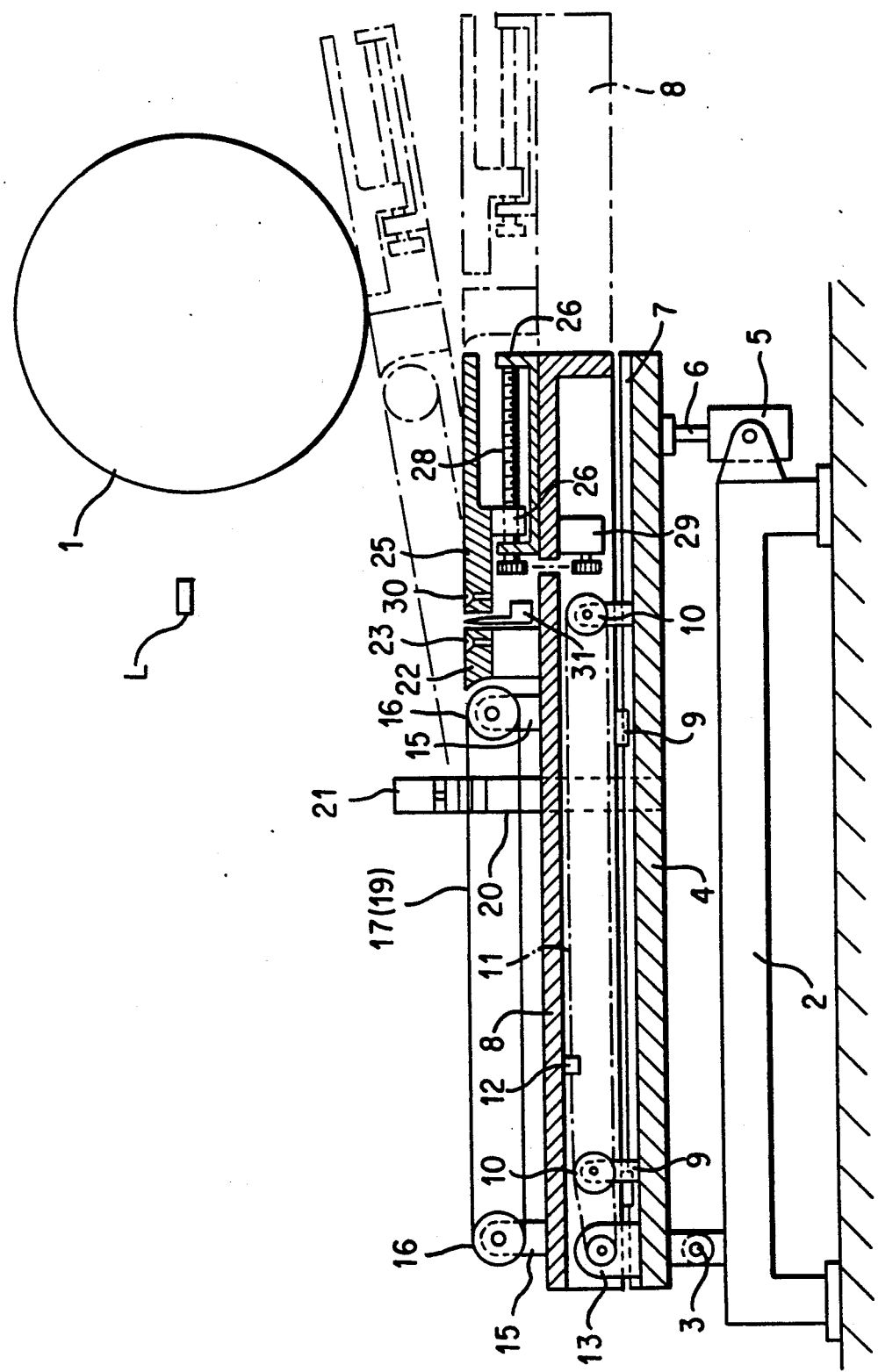
FIG. 1 is a side elevation view in partial section showing a strip winder embodying the principles of the invention.

Referring to FIGS. 1 through 10, the reference numeral 1 represents a tire building drum which, when driven counterclockwise, takes up a strip B (FIGS. 3 through 10) fed underneath it. Disposed forwardly (to the left in FIG. 1) of the building drum 1 is a photoelectric element L for detecting the lead end of the strip B. Disposed on the floor below the photoelectric element L is a machine base 2 which is elongated in a direction at right angles to the axis of said drum 1. Swingably mounted on this base 2 is a swing frame 4 having a pivot 3 close to the end of said base 2 which is away from the drum 1, while the forward end portion of the frame 4 which is closer to the drum 1 is connected to the free end of a piston rod 6 of a lift air cylinder 5 which is pivotally mounted on the front end of the base 2 so that the swing frame 4 may swing up and down in response to the forward and rearward strokes of said piston rod 6. It should be understood that a screw jack may be used in lieu of the lift air cylinder 5.

Disposed at the top right and left sides (near and farther sides in the view) of said swing frame 4 are a couple of rails 7 extending in the longitudinal direction, and an overhead slide frame 8 rests slidably on said rails 7 through slide blocks 9 disposed on the underside thereof. A transmission chain 11 extends between front and rear guide sprockets 10,10 disposed on said swing frame 4 and the ends of the chain 11 are connected to a projection 12 formed on the underside of said swing frame 8. The transmission chain 11 is driven in the normal or reverse direction by a slide motor 13 installed at the rear end of the swing frame 4.

Figure 2:
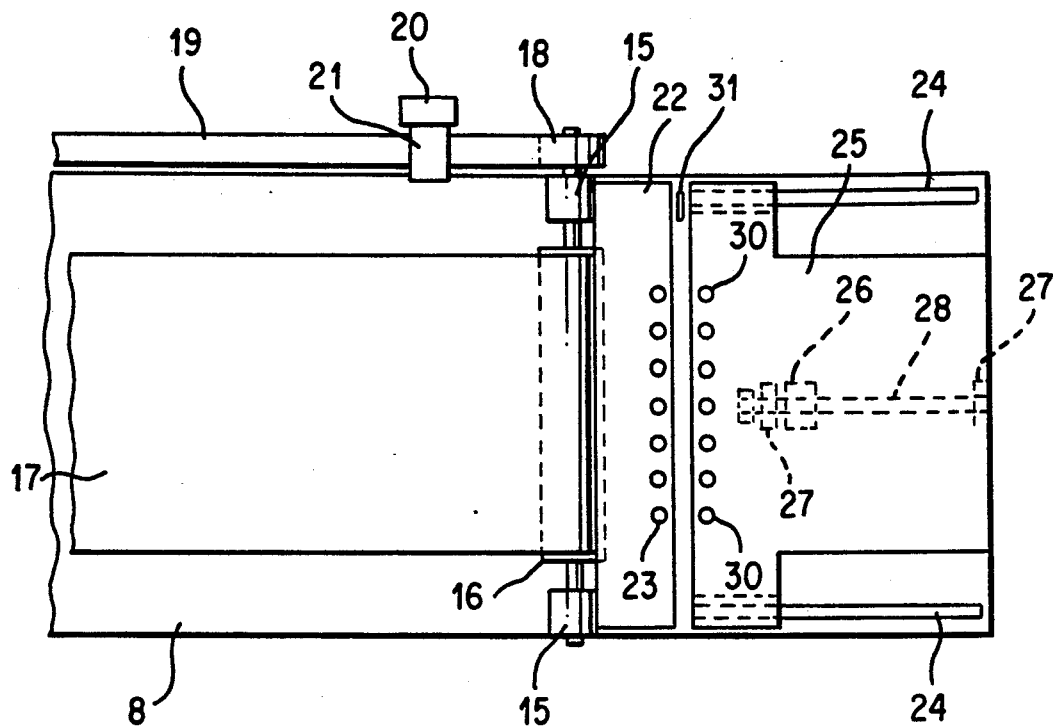
FIG. 2 is a plan view showing the anterior part of the strip winder shown in FIG. 1.

Belt pulleys 16,16 are rotatably supported by brackets 15,15 disposed at the rear part and somewhat forwardly of the center, respectively, of said slide frame 8, and a strip transport belt 17 extends between these front and rear pulleys 16,16 so as to be driven by a transport motor (not shown). Fixedly secured to one end of the shaft of each pulley 16 is an auxiliary pulley 18 which is narrower in width and an auxiliary belt 19 extends between these front and rear auxiliary pulleys 18,18 as shown in FIG. 2 so that the auxiliary belt 19 and the transport belt 17 may travel as a unit. Securely mounted on top of a post 20 erected from said swing frame 4 is a clamp 21 comprising a drive air cylinder and a pair of upper and lower jaws so that as the air cylinder is driven to close the upper and lower jaws, the upper run of said auxiliary belt 19 is sandwiched therebetween to preclude horizontal displacement of the transport belt 17.

Secured to the front end of said slide frame 8 is a stationary cutting bed 22 in close proximity with the front pulley 16 for said transport belt 17. This stationary cutting bed 22 is formed with a flat, smooth upper surface which is substantially flush with said transport belt 17 and is provided with a plurality of suction orifices 23 opening on the forward part of said upper surface. Connected to these suction orifices 23 is a vacuum source through a solenoid valve (not shown). Disposed forwardly of this stationary cutting bed 22 are a pair of slide rails 24,24 (FIG. 2) and a movable cutting bed 25 rests on these rails 24,24 through the corresponding slide blocks attached to the underside thereof. A nut 26 projecting centrally from the underside of said movable cutting bed 25 is engaged by a longitudinally extending threaded shaft 28 supported on the slide frame 8 by a bracket 27 and the threaded shaft 28 is driven in the normal or reverse direction by a servo motor 29 (FIG. 1) disposed on the underside of the slide frame 8, whereby the movable cutting bed 25 is shifted forwards and backwards. The movable cutting bed 25 is formed with a smooth flat upper surface which is flush with said stationary cutting bed 22, with a plurality of suction orifices 30 opening at the rear end part thereof and connected to a vacuum source through a solenoid valve. Interposed between said stationary cutting bed 22 and said movable cutting bed 25 is a traveling cutter 31, the edge of which projects upwardly through the clearance between the two cutting beds 22,25.

Figure 3:
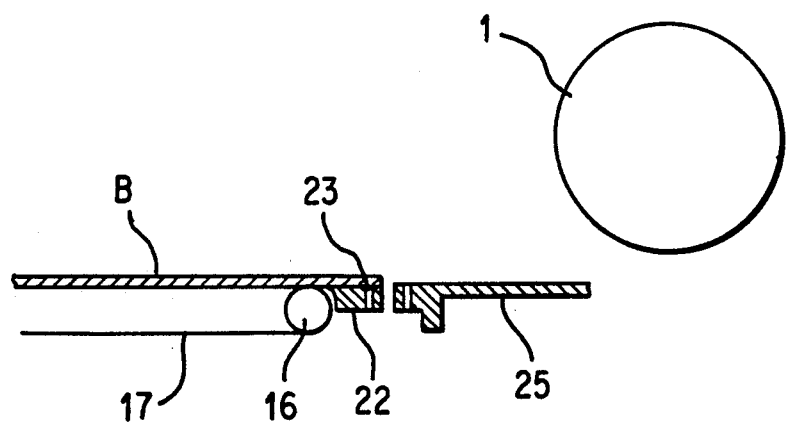
FIGS. 3 through 10 are side elevation views of the strip of FIG. 1 as disposed on the building drum, showing the sequence of operation.
Figure 4:
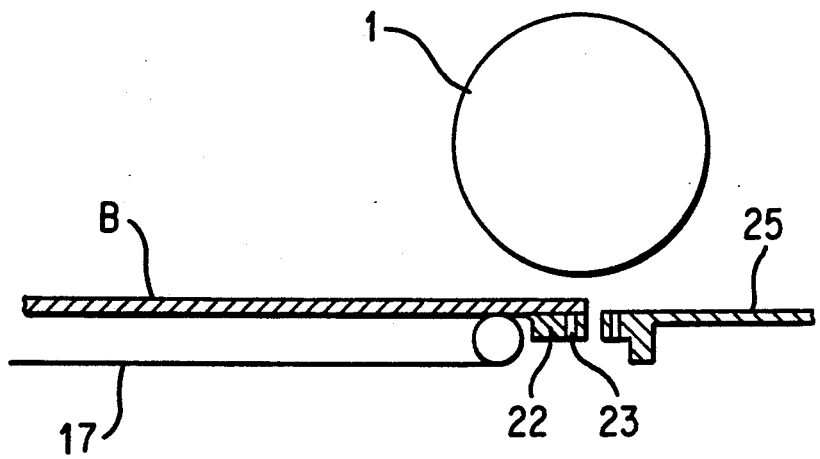

In the above arrangement, when the piston rod 6 of the lift air cylinder 5 has been retracted to dispose the swing frame 4 in the down position and the slide frame 8 is in the retreated position away from the building drum 1 as illustrated in FIG. 1, the strip B is placed on the stationary cutting bed 22 and transport belt 17 in such a manner that its leading end thereof lines up with the front edge of the stationary cutting bed 22 as illustrated in FIG. 3 and a negative pressure is allowed to act on the suction orifices 23 opening on the upper surface of the stationary cutting bed 22 to thereby fix the leading end of the strip B in position on the stationary cutting bed 22.

Figure 5:
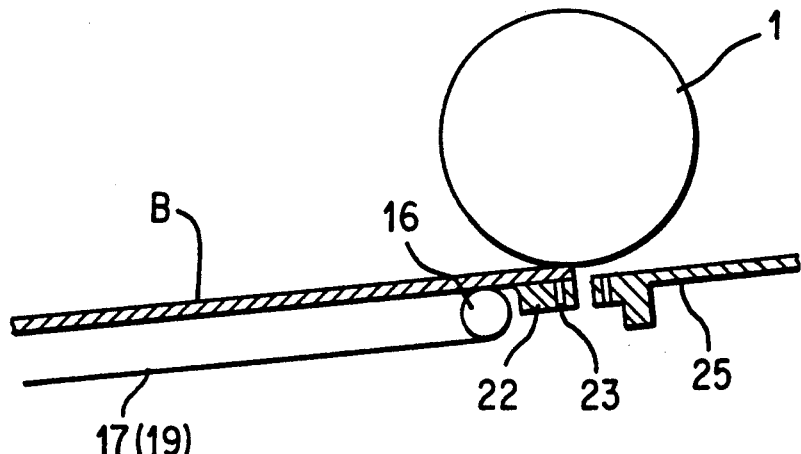
Figure 6:
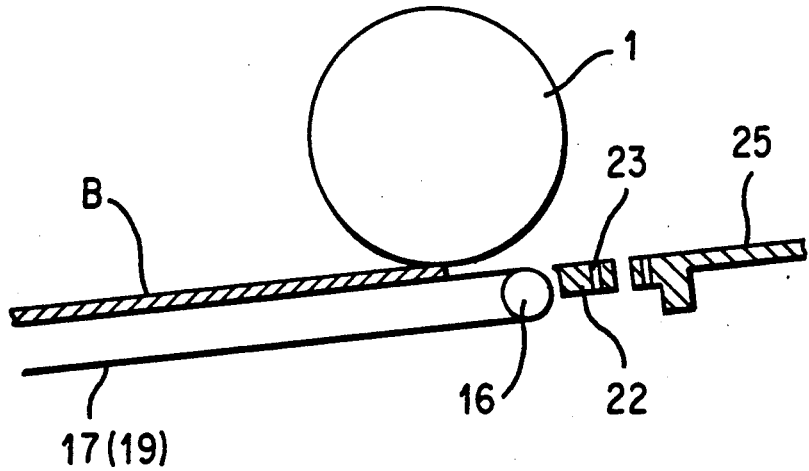

Then, the slide motor 13 is actuated to advance the slide frame 8 (FIG. 4) and the swing frame 4 is swung up to bring the leading end of the strip B into pressure contact with the lower edge of said drum 1 (FIG. 5). Then, the upper run of the auxiliary belt 19, instead of the conveyance run of the transport belt 17, is clamped with the clamp 21 to preclude horizontal displacement of the conveyance run of the transport belt 17 and, with the suction orifices 23 of said stationary cutting bed 22 being disconnected from communication with the vacuum source, the slide frame 8 is advanced a predetermined distance to shift the pulleys 16 for the transport belt 17, the stationary cutting bed 22 and movable cutting bed 25 in the forward direction while the strip B is held stationary (FIG. 6).

Figure 7:
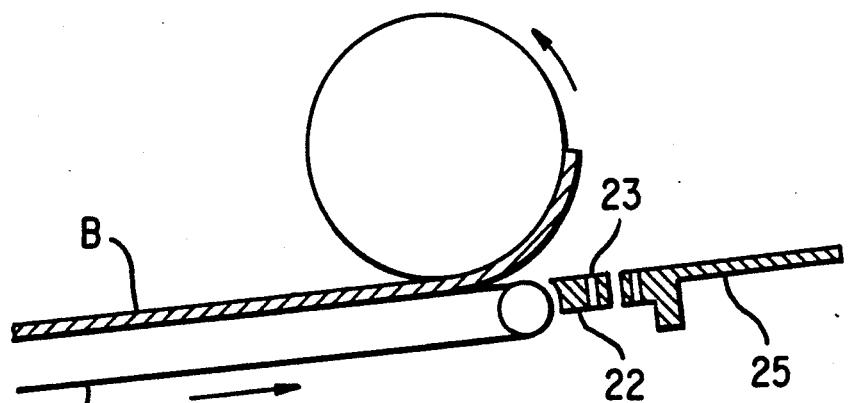
Figure 8:
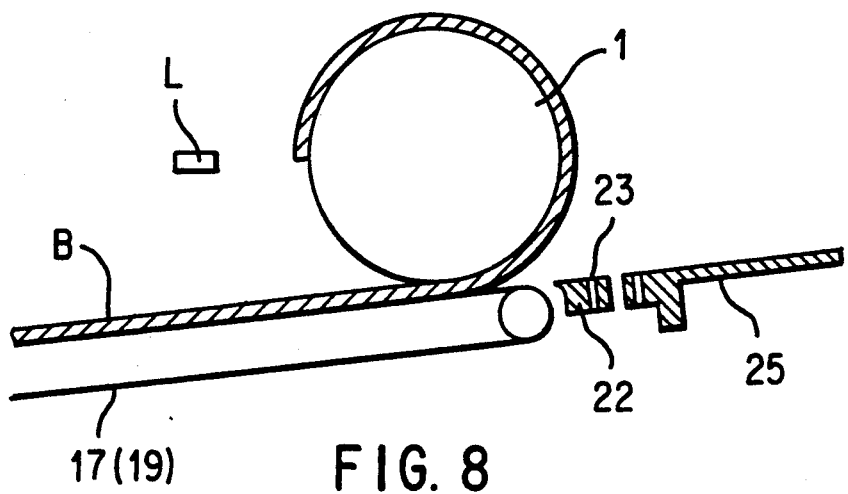
Figure 9:
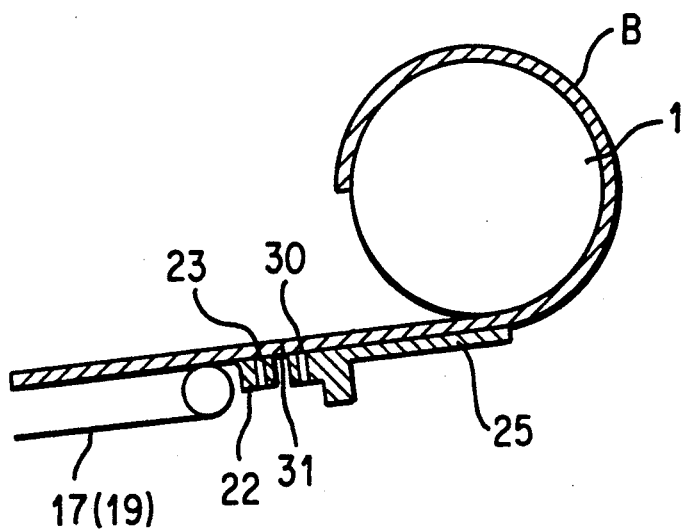
Figure 10:
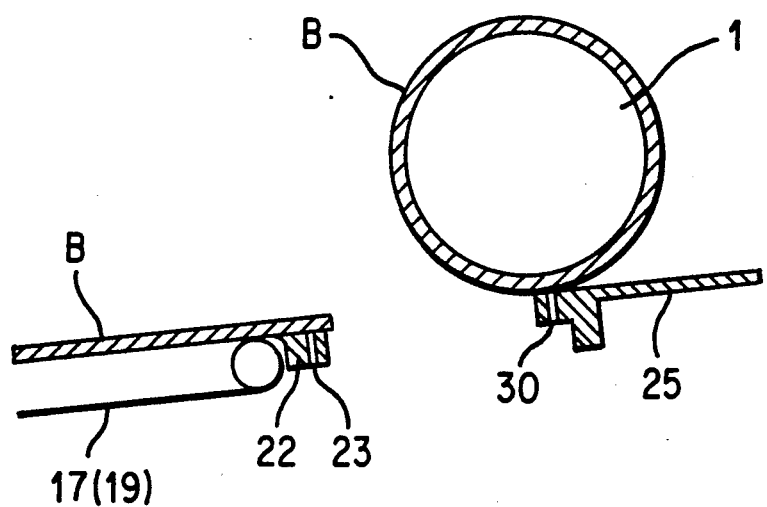

Then, the clamp 21 is opened to release the transport belt 17, after which the tire building drum 1 and the transport belt 17 are driven at the same speed to wind the strip B onto the building drum 1 under no tension (FIG. 7). When the drum 1 has turned about ¾ turns from a set position, the leading end of the strip B on the drum 1 is detected by the photoelectric sensor element L and the building drum 1 and the transport belt 17 are then stopped in response to the detection signal of the element L. Then, the clamp 21 is closed again to fix the conveyance run of said transport belt 17 in position and the slide frame 8 is driven back in that condition, whereby the transport belt 17, stationary cutting bed 22 and movable cutting bed 25 are shifted over a predetermined distance while the strip B is kept stationary (FIG. 9). In this state, the distance from the traveling cutter 31 between the stationary cutting bed 22 and movable cutting bed 25 to the winding start point at the lower edge of the tire building drum 1 is equal to about ¼ of the circumferential length of the tire, that is to say the distance from the lower edge of said drum 1 to the leading end of the strip B on the drum 1. Then, a negative pressure is introduced to the suction orifices 23,30 opening on the upper surfaces of the stationary and movable cutting beds 22 and 25, respectively, to fix the strip B in position on the stationary cutting bed 22 and movable cutting bed 25 and the traveling cutter 31 is then driven to cut the strip B. Thereafter, as the movable cutting bed 25 is advanced away from the stationary cutting bed 22, the tire building drum 1 is driven at a peripheral speed equal to the advancing speed of the movable cutting bed 25, whereby the remaining portion of the cut strip B is wound under no tension (FIG. 10). Upon completion of this winding, the supply of suction to the movable cutting bed 25 is terminated and the rotation of the tire building drum 1 and the advance of the movable cutting bed 25 are respectively stopped. Then, the swing frame 4 is caused to descend, the slide frame 8 is retreated and the movable cutting bed 25 is shifted back to the initial standby position.

Figure 11:
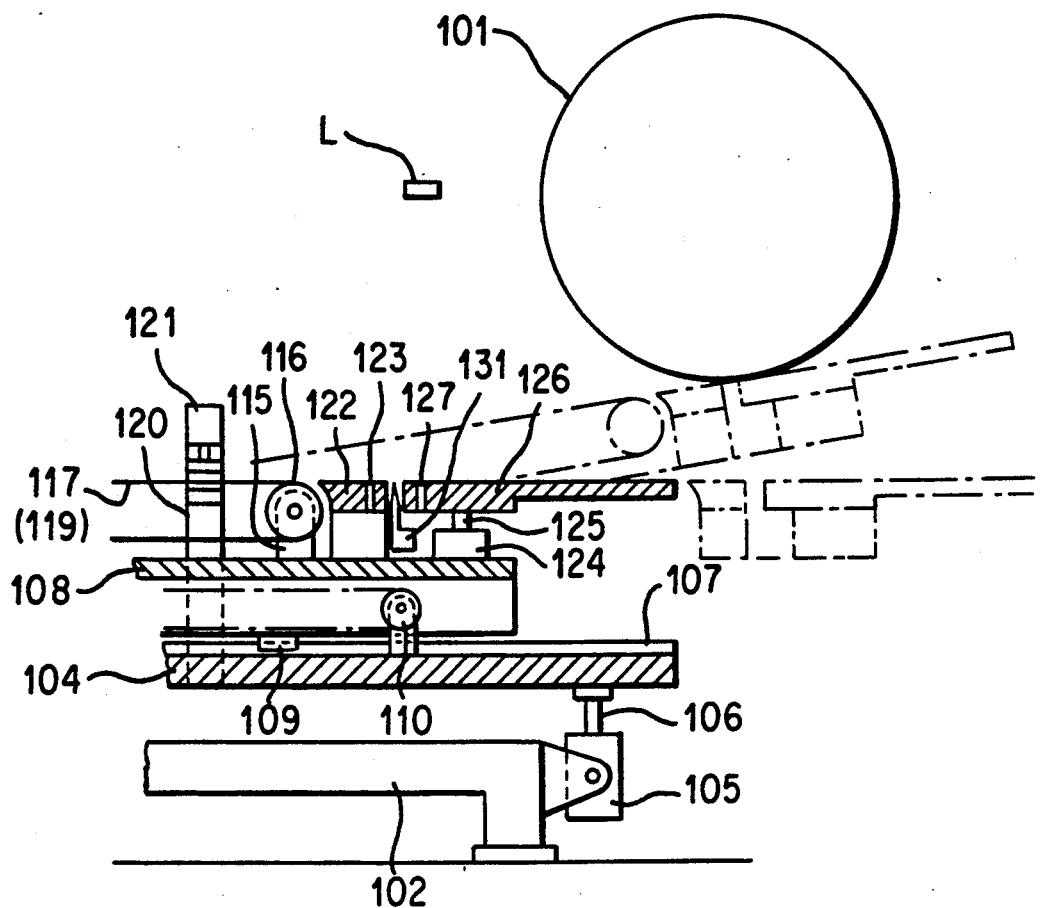
FIG. 11 is a side elevation view in partial section similar to FIG. 1, showing the anterior part of another embodiment of the invention.
Figure 12:
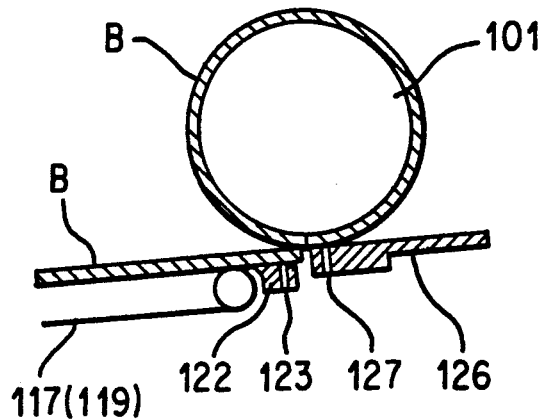
FIG. 12 is a side elevation view corresponding to FIG. 10, showing the strip winder of FIG. 11.

A second embodiment of the invention is illustrated in FIGS. 11 and 12. The parts corresponding to those of the first embodiment are indicated by reference numerals corresponding to 100 plus the numerals used for the first embodiment. In this embodiment, a first cutting bed 122 and a contact air cylinder 124 are kept stationary and a second cutting bed 126 is rigidly secured to an upwardly extending piston rod 125 of said contact air cylinder 124. The upper surfaces of said first cutting bed 122 and second cutting bed 126 are substantially flush with the surface of a transport belt 117 when the piston rod 125 is in the retracted position. Otherwise, the construction of the first cutting bed 122 and that of the second cutting bed 126 are identical to those of the stationary cutting bed 22 and movable cutting bed 25 of the first embodiment. The operations of these cutting beds 122,126 are identical to those described for the first embodiment up to the stage where the traveling cutter 131 is driven to cut the strip B. In this embodiment, however, the slide frame 108 is thereafter shifted forward and concurrently the tire building drum 101 is driven at a speed equal to the advancing speed of the slide frame 108 to wind the remaining portion of the strip B on the drum 101 and the piston rod 125 of the contact air cylinder 124 is actuated to compress the winding finish end of the strip B against the drum 101 (FIG. 12). Upon completion of the winding, the supply of suction to the second cutting bed 126 is suspended and the rotation of the tire building drum 101 and the advance of the slide frame 108 are respectively terminated. The second cutting bed is then caused to descend, the swing frame 104 is lowered, and the slide frame 108 is shifted back to the initial standby position. In this embodiment, inasmuch the second cutting bed 126 is driven up and down by the contact air cylinder 124, the winding finish end of the strip B can be automatically brought into pressure contact with the tire building drum 101.

What is claimed is:

1. A strip winding system for a tire building machine which comprises a tire building drum, a swing frame disposed below and in a given direction with respect to the building drum and extending in a longitudinal direction at right angles to the axis of the building drum in such a manner that it may swing vertically about a pivot close to one end thereof which is farther away from said building drum, a slide frame mounted on said swing frame so as to be slidable along the longitudinal axis thereof and having mounted thereon a strip transport belt, a first cutting bed and a second cutting bed disposed in the order mentioned from said pivot of said swing frame toward said building drum, both cutting beds being longitudinally stationary relative to said slide frame, a traveling cutter for cutting said strip disposed between said first and second cutting beds, said first and second cutting beds respectively having suction orifices opening on the juxtaposed upper surfaces thereof for fixing said strip in position, and said slide frame having a post carrying a clamp on top thereof for fixing the conveyance run of said transport belt, said slide frame and swing frame being movable to a position in which a leading end portion of said strip which is aligned with the front edge of the first cutting bed is brought into pressure contact with the lower end of said building drum, in which position the slide frame with said transport belt fixed by said clamp is then capable of sliding movement while said strip is kept stationary to transfer the leading end portion of the strip from the first cutting bed onto the conveyance run of said transport belt.

2. The system claimed in claim 1 wherein said second cutting bed is vertically movable.

* * * * *